Patented July 19, 1932

1,867,858

UNITED STATES PATENT OFFICE

WALTER MIEG, OF OPLADEN, NEAR COLOGNE, GERMANY, ASSIGNOR TO GENERAL ANILINE WORKS, INC., OF NEW YORK, N. Y., A CORPORATION OF DELAWARE

PROCESS FOR PRODUCING AN ANTHRAQUINONE DYE

No Drawing. Application filed March 14, 1931, Serial No. 522,784, and in Germany February 28, 1927.

The present invention relates to a process of preparing 1.1'-dihydroxy-2.2'-dianthraquinonyl.

In accordance with the invention 1.1'-dihydroxy-2.2'-dianthraquinonyl corresponding to the probable formula:—

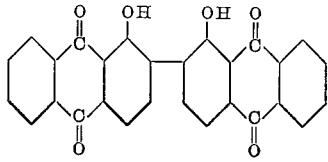

is obtained in a convenient manner and in a good yield, by reacting at a temperature surmounting about 100° C. upon 1-hydroxyanthraquinone with an aluminium halogenide, such as aluminium chloride or aluminium bromide, in the presence of a tertiary heterocyclic organic base, such as pyridine, quinoline, homologues of these compounds etc. The reaction is advantageously performed by introducing the aluminium halogenide, preferably aluminium chloride, into the tertiary heterocyclic base while cooling, adding 1-hydroxyanthraquinone and heating the reaction mixture to above about 100° C., preferably to a temperature between about 120-150° C. The working up of the reaction mixture may be performed by pouring it into a dilute aqueous sodium hydroxide solution, whereby the reaction product separates in form of its sodium salt.

The following examples illustrate my invention, without limiting it thereto, the parts being by weight:—

Example 1

20 parts of anhydrous aluminium chloride are introduced with cooling into 40 parts of pyridine, dried over barium oxide, care being taken that the temperature does not rise above 100° C. Thereupon 10 parts of 1-hydroxyanthraquinone are stirred in at about 100° C., and the reaction mixture is heated for a short time to about 130° C., until a test portion in aqueous sodium hydroxide solution on being shaken with pyridine dissolves in the pyridine layer with a bluish violet coloration, as distinct from the starting material, which under these conditions dissolves in pyridine with a red coloration. The working up can be effected by introducing the cooled reaction mixture into an excess of a dilute aqueous sodium hydroxide solution, whereby the reaction product separates in form of its sodium salt. It can be purified by revatting from an alkaline aqueous hydrosulfite solution. By decomposing the alkali metal salt thus obtained with an acid, the free 1.1'-dihydroxy-2.2'-dianthraquinonyl is obtained in a good yield and in a good state of purity. It is identical to the product described in German Patent 167,461, which product subsequently was identified as being 1.1'-dihydroxy-2.2'-dianthraquinonyl (Berichte der deutschen chemischen Gesellschaft, vol. 52, page 2255).

Example 2

6 parts of anhydrous aluminium chloride are introduced into 15 parts of a technical mixture of homologues of pyridine boiling between about 125-130° C., while cooling. After that 3 parts of 1-hydroxyanthraquinone are stirred in and the mixture is heated for about 10 minutes to 130-140° C. After cooling the reaction mixture is poured into dilute aqueous sodium hydroxide solution and air is blown through the mixture in order to oxidize part of the reaction product being present in the leuco form. The further working up may be performed as described in Example 1.

Example 3

A mixture of 15 parts of quinoline, 5 parts of anhydrous aluminium chloride and 3 parts of 1-hydroxyanthraquinone is heated to 135-140° C. for about 15 minutes. After cooling, the reaction mixture is poured into dilute hydrochloric acid, the precipitate thus obtained filtered, dissolved in aqueous alkaline hydrosulfite solution and separated again by blowing air through the solution.

This is a continuation in part of my co-pending application Serial No. 251,752, filed Feb. 3, 1928.

I claim:—

1. The process which comprises heating 1-hydroxyanthraquinone with an aluminium halogenide to a temperature above about 100° C. in the presence of a tertiary heterocyclic organic base.

2. The process which comprises heating 1-hydroxyanthraquinone with aluminium chloride to a temperature above about 100° C. in the presence of a tertiary heterocyclic organic base.

3. The process which comprises heating 1-hydroxyanthraquinone with aluminium chloride to a temperature between about 120–150° C. in the presence of a compound of the group consisting of pyridine and its homologues.

WALTER MIEG.